United States Patent [19]
Kaplan

[11] Patent Number: 5,812,651
[45] Date of Patent: Sep. 22, 1998

[54] TELEPHONE NUMBER PARSER FOR WIRELESS LOCAL LOOP TELEPHONES

[75] Inventor: Diego Kaplan, San Diego, Calif.

[73] Assignee: QUALCOMM Incorporated, San Diego, Calif.

[21] Appl. No.: 608,924

[22] Filed: Feb. 29, 1996

[51] Int. Cl.$^6$ .................................................... H04M 3/42
[52] U.S. Cl. ......................... 379/200; 379/355; 455/414
[58] Field of Search ................................... 379/355, 188, 379/199, 200; 455/414, 422

[56] References Cited

U.S. PATENT DOCUMENTS

| | | | |
|---|---|---|---|
| 4,658,096 | 4/1987 | West, Jr. et al. | 379/59 |
| 4,737,975 | 4/1988 | Shafer | 379/58 |
| 4,775,997 | 10/1988 | West, Jr. et al. | 379/58 |
| 4,922,517 | 5/1990 | West, Jr. et al. | 379/58 |
| 5,353,331 | 10/1994 | Emery et al. | 379/58 |
| 5,475,743 | 12/1995 | Nixon et al. | 379/355 |

*Primary Examiner*—Ahmad F. Matar
*Attorney, Agent, or Firm*—Russell B. Miller; Brian S. Edmonston

[57] ABSTRACT

A complete telephone number detection unit is described for use within a wireless local loop telephone. The detection unit examines digits or other symbols entered by user via a telephone keypad to determine whether a completed telephone number has been entered. If a completed telephone number has been entered, the detection unit signals other components of the telephone to transmit the telephone number. If the telephone number is not yet complete, then the detection unit awaits entry of additional digits or other symbols. To determine whether a completed telephone number has been entered, the detection unit accesses a parsing table having rows corresponding to different parsing states of permissible telephone numbers. Each row of the table includes a set of columns with one column corresponding to each of digits 0–9, the "*" symbol and the "#" symbol. To parse a telephone number using the table, each digit is applied to the table to yield a value. The value either provides a pointer to another row of the table or contains a value identifying that the telephone number is complete. If the value is a pointer value, then the next digit or other symbol received is employed to access the row pointed to by the pointer value. Each succeeding digit of the telephone number is employed to access the parsing table resulting in transitions from one row of the table to another until a value is read indicating a complete telephone number. Method and apparatus embodiments of the invention are described.

20 Claims, 12 Drawing Sheets

| | 0 | 1 | 2 | 3 | 4 | 5 | 6 | 7 | 8 | 9 | * | # | tmr |
|---|---|---|---|---|---|---|---|---|---|---|---|---|---|
| 0 | 0 | 0 | 0 | 0 | 0 | 0 | 0 | 0 | 0 | 0 | -1 | 127 | 20 |
| 1 | 2 | 13 | 17 | 17 | 17 | 17 | 17 | 17 | 17 | 17 | 19 | 26 | 0 |
| 2 | 127 | 3 | 4 | 4 | 4 | 4 | 4 | 4 | 4 | 4 | -1 | 127 | 10 |
| 3 | 0 | 0 | 0 | 0 | 0 | 0 | 0 | 0 | 0 | 0 | -1 | 127 | 16 |
| 4 | 5 | 5 | 5 | 5 | 5 | 5 | 5 | 5 | 5 | 5 | -1 | 127 | 20 |
| 5 | 6 | 6 | 6 | 6 | 6 | 6 | 6 | 6 | 6 | 6 | -1 | 127 | 20 |
| 6 | -1 | -1 | 7 | 7 | 7 | 7 | 7 | 7 | 7 | 7 | -1 | 127 | 20 |
| 7 | 8 | 8 | 8 | 8 | 8 | 8 | 8 | 8 | 8 | 8 | -1 | 127 | 20 |
| 8 | 9 | 9 | 9 | 9 | 9 | 9 | 9 | 9 | 9 | 9 | -1 | 127 | 20 |
| 9 | 10 | 10 | 10 | 10 | 10 | 10 | 10 | 10 | 10 | 10 | -1 | 127 | 20 |
| 10 | 11 | 11 | 11 | 11 | 11 | 11 | 11 | 11 | 11 | 11 | -1 | 127 | 20 |
| 11 | 12 | 12 | 12 | 12 | 12 | 12 | 12 | 12 | 12 | 12 | -1 | 127 | 20 |
| 12 | 127 | 127 | 127 | 127 | 127 | 127 | 127 | 127 | 127 | 127 | -1 | 127 | 20 |
| 13 | 14 | -1 | 4 | 4 | 15 | 4 | 4 | 4 | 4 | 4 | -1 | 127 | 20 |
| 14 | 0 | 0 | 0 | 0 | 0 | 0 | 0 | 0 | 0 | 0 | -1 | 127 | 24 |
| 15 | 5 | 16 | 5 | 5 | 5 | 5 | 5 | 5 | 5 | 5 | -1 | 127 | 20 |
| 16 | 6 | 127 | 6 | 6 | 6 | 6 | 6 | 6 | 6 | 6 | -1 | 127 | 20 |
| 17 | 8 | 18 | 8 | 8 | 8 | 8 | 8 | 8 | 8 | 8 | -1 | 127 | 20 |
| 18 | 9 | 127 | 9 | 9 | 9 | 9 | 9 | 9 | 9 | 9 | -1 | 127 | 20 |
| 19 | 24 | 23 | 20 | 20 | 20 | 20 | 20 | 20 | 20 | 20 | 25 | 127 | 20 |
| 20 | 22 | 21 | 22 | 22 | 22 | 22 | 22 | 22 | 22 | 22 | -1 | 127 | 20 |
| 21 | 22 | 127 | 22 | 22 | 22 | 22 | 22 | 22 | 22 | 22 | -1 | 127 | 20 |
| 22 | 22 | 22 | 22 | 22 | 22 | 22 | 22 | 22 | 22 | 22 | -1 | 127 | 20 |
| 23 | 22 | 22 | 22 | 22 | 22 | 22 | 22 | 22 | 22 | 22 | -1 | 127 | 20 |
| 24 | 22 | 22 | 22 | 22 | 22 | 22 | 22 | 22 | 22 | 22 | -1 | 127 | 10 |
| 25 | 26 | 26 | 26 | 26 | 26 | 26 | 26 | 26 | 26 | 26 | -1 | 127 | 20 |
| 26 | 26 | 26 | 26 | 26 | 26 | 26 | 26 | 26 | 26 | 26 | -1 | 127 | 20 |

FIG. 3

TELEPHONE NUMBER PARSER FOR WIRELESS LOCAL LOOP TELEPHONES

BACKGROUND OF THE INVENTION

I. Field of the Invention

The invention generally relates to wireless local loop telephones and in particular to techniques for determining whether a telephone number entered into the telephone represents a completed number ready for transmission.

II. Description of Related Art

A wireless local loop telephone is essentially a cellular telephone configured to emulate a telephone connected to a public switch telephone network (PSTN). The wireless local loop telephone communicates with a base station using one of the variety of cellular transmission techniques such as frequency domain multiple access (FDMA), time domain multiple access (TDMA) and code division multiple access (CDMA). However, unlike conventional cellular telephones which are configured to allow roaming wherein the telephone may be, and typically is, moved from one cell to another, wireless local loop telephones are configured to operate only within one cell. Although the telephone may be moved within the cell, perhaps from one room of a house to another or from one office of a building to another, the telephone cannot be operated if moved to another cell. Other differences between wireless local loop telephones and conventional cellular telephones are as follows. With a cellular telephone, operation of the phone is initiated by pressing an ON button or similar button. With a wireless local loop telephone, the phone is activated automatically by taking a handset of the telephone off-hook. With conventional cellular telephones, once a telephone number has been entered, the user must press a SEND button to transmit the telephone to the local cellular base station. With a typical wireless local loop telephone, the user need not press a SEND button. Rather, the telephone includes circuitry or other logic for determining when a completed telephone number has been entered by the user and for automatically sending the telephone number at that time. Typically, this is achieved by activating a timer after each digit (or other symbol such as a pound "#" symbol or star "*" symbol) has been entered. If no additional symbols are entered within a predetermined time out period, then the telephone number is assumed to be complete and all previously entered symbols are transmitted. If an additional symbol is entered within the time out period, then the timer is reset. For some conventional wireless local loop telephones, the timer is provided with a preset time out period of three or four seconds.

Although the timer based technique for determining when a complete telephone number has been entered for the purposes of transmitting the number is somewhat satisfactory, considerable room for improvement remains. In some circumstances, a user may be delayed in entering an additional digit of a telephone number, perhaps while attempting to verify the remaining digits of the number by consulting a telephone directory or perhaps as a result of a household distraction. If the delay exceeds the time out period, the telephone assumes that the complete telephone number has been entered and transmits the incomplete telephone number. Typically, such results in a error signal returned from the wireless local loop system. Within some telephone systems, however, such can result in a telephone call being connected to a wrong number. Moreover, even when all digits of a telephone number are entered properly without any substantial delay between the digits, the telephone number is not actually transmitted until the time out period of perhaps three or four seconds has elapsed since the last entered digit. Such can represent an annoyance to the user, particularly when making a urgent telephone call, perhaps to a local police, fire department or other emergency personnel.

Accordingly, it would be desirable to provide an improved technique for determining when a completed telephone number has been entered into a wireless local loop telephone which at least partially avoids the disadvantages of conventional timer-based techniques discussed above. It is to that end that aspects of the present invention are primarily drawn.

SUMMARY OF THE INVENTION

In accordance with the invention, a method and apparatus for determining whether a completed telephone number, or other string of symbols, has been entered into a wireless local loop telephone is provided. In accordance with one aspect of the invention, digits entered by a user including symbols such as the pound "#" symbol and the star "*" symbol, are individually analyzed and parsed to determine whether a complete telephone number or other string of symbols has been entered for the purposes of transmitting the telephone number. To this end, a parsing table is provided with rows representative of different parsing states against which input digits or other symbols are compared. For example, for a telephone for use within the United States, the parsing table includes rows configured to identify a completed input string if the digits 411 are entered, indicating a telephone call to a local information operator. Entries in the table vary from country to country to accommodate different telephone systems.

In an exemplary embodiment, the parsing table includes a plurality of rows representative of different parsing states and a plurality of columns representative of different input symbols. For a parsing table for use within a wireless local loop telephone in the United States, for example, the parsing table includes columns for digits 0–9 and separate columns for the "#" symbols and the "*" symbol. Each row and column combination of the parsing table uniquely identifies a single value or entry. The value represents either a pointer to another row of the table, a final state value indicating that a completed telephone number or other string has been entered, an error state value indicating that an error has occurred, or a value indicating that a feature code has been entered, such as an auto dial feature prefixed by the "*" symbol. Input telephone numbers or other strings are parsed using the table, as follows. After a handset of the telephone is taken off-hook and a first digit or other symbol is entered, the table is accessed using a row pointer identifying a starting row and a column pointer corresponding to the input digit or other symbol. The row pointer and column pointer uniquely identify an entry within the table. If the entry specifies another row of the table, then the row pointer is updated to identify the row. When a second digit or other symbol is received, the table is accessed using the new row pointer and the new digit to yield yet another entry. This process continues until either an entry is read from the table specifying that a completed telephone number or other string has been entered, at which time all previously entered digits or other symbols are transmitted; or until an entry is read that identifies that a feature command has been entered, such as an auto dial feature or the like, at which time the telephone is controlled to perform the requested function specified by the received feature command. Processing may also terminate if an entry is read indicating an error condition such as might occur if a user attempts to enter a restricted telephone number.

Thus, digits are entered and rows of the parsing table accessed until an entry is read from the parsing table indicating that the telephone number is complete, an error has occurred or that a feature command has been entered. For example, within the United States, when directly dialing a long distance telephone number, the parsing table will be accessed eleven times, corresponding to the direct dial prefix 1, the area code, and the local telephone number. As each digit is entered, different rows of the parsing table are accessed to read new pointer values until the last digit of the telephone number is entered, at which time the entry read from the table specifies that a complete telephone number has been entered and the telephone number is then transmitted.

In one embodiment, the parsing table includes an additional column specifying an inter-digit timer value for each row. When a row is accessed, the timer value for that row is read out and a timer is activated using the inter-digit timer value as a time out period. If no further digits or other symbols are entered within the time out period specified by the timer value, then the telephone number or other string is deemed to be complete, and is transmitted. In one specific example, the time out values are specified in units of half seconds and may be set to, for example, ten or twenty half second units. The timer values are provided to account for any telephone numbers or other strings, such as international telephone numbers, where the total number of digits cannot be, or need not be, uniquely specified by the parsing table. For example, for a parsing table for use within a wireless local loop telephone within tie United States, the table may be configured to trigger the timer if digits 0 and 1 are entered indicating an international telephone number of undetermined length. The timer value also ensures that, regardless of the telephone digits entered, the digits will eventually be transmitted. Hence, even for parsing states where the total number of digits is uniquely specified within the parsing table, the timer is still invoked to ensure that digits are eventually transmitted. Otherwise, a user may enter several digits of a telephone number of predetermined length, such as a United States long distance telephone number, then fail to complete the telephone number. Without the time out feature, the telephone might remain in a "wait" state indefinitely. With the timer, however, the entered digits of the telephone number, although incomplete, are eventually transmitted and a responsive error signal is received from the wireless local loop telephone system alerting the user that an incomplete telephone number has been entered.

Thus, a parsing table is provided for use in parsing input telephone numbers or other strings to determine whether it is appropriate to transmit the received digits or other symbols. Entries of the parsing table vary from country to country as a result of differences in telephone systems. The table is preferably implemented using a software data structure to thereby allow the table to be easily modified to accommodate changes in telephone systems. However, for some applications, it may be desirable to implement the parsing table by another means, such as in hardware rather than software.

By parsing input telephone numbers or other strings and determining therefrom when a complete telephone number has been entered, the telephone need not always wait a predetermined time out period after each digit to determine whether previously entered digits need to be transmitted. As such, user annoyance is avoided and telephone numbers are more promptly transmitted which, especially for emergency telephone calls, is particularly advantageous. Thus, the general object set forth above is achieved. Other objects, features and advantages of the invention will be apparent from the detailed description which follows and the accompanying drawings.

BRIEF DESCRIPTION OF THE DRAWINGS

FIG. 3 is a diagram illustrating a parsing table for use in parsing telephone numbers for use by the telephone system of FIG. 1 within the United States.

DETAILED DESCRIPTION OF EXEMPLARY EMBODIMENTS OF THE INVENTION

With reference to the remaining figures, exemplary embodiments of the invention will now be described. The exemplary embodiments are described primarily with reference to block diagrams and flowcharts. As to the flowcharts, each block within the flowcharts represents both the method step and an apparatus element for performing the method step. Herein, the apparatus element may be referred to as a means for, an element for, or a unit for performing the method step. Depending upon the implementation, the apparatus element, or portions thereof, may be configured in hardware, software, firmware or combinations thereof. As to the block diagrams, it should be appreciated that not all components necessary for a complete implementation of a practical system are illustrated or described in detail. Rather, only those components necessary for a thorough understanding of the invention are illustrated and described. Furthermore, components which are either conventional or may be readily designed and fabricated in accordance with the teachings provided herein are not described in detail.

Figure 1:
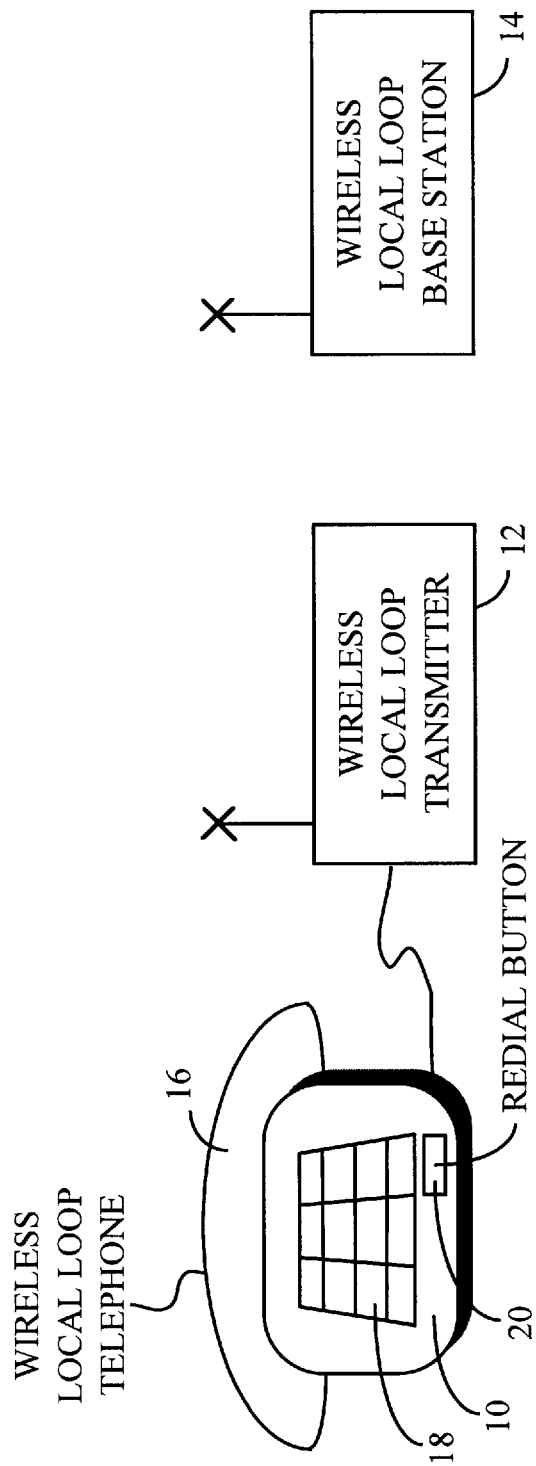
FIG. 1 is a block diagram of a portion of a wireless local loop telephone system.

FIG. 1 illustrates a telephone 10 connected to a local wireless local loop transmitter 12 which transmits signals to, and receives signals from, a wireless local loop base station 14 which, although not shown, may be connected to a PSTN system. In use, a user takes a handset 16 of telephone 10 off-hook to initiate a telephone call. Once the handset is taken off-hook, an artificial dial tone is presented to the user to emulate a PSTN telephone. The user enters a telephone number through a keypad 18 which includes, at least, keys for digits 0–9 and keys for the * symbol and the # symbol. As digits or other symbols are entered by the user, circuitry or other logic to be described below examines the entered symbols and determines therefrom whether a complete telephone number has been entered. Once the determination has been made, the complete telephone number is forwarded to the local wireless local loop transmitter 12 for transmission to the local base station 14 for initiating a telephone call. The base station may, for example, re-transmit the telephone number over a PSTN telephone line using conventional pulses or tones to another telephone connected to the PSTN. Transmission between local station 12 and base station 14 may be in accordance with a variety of convention cellular technology transmission protocols including the aforementioned FDMA, TDMA, and CDMA techniques.

Ultimately, the telephone call is terminated by the user by placing handset 16 on-hook. Telephone 10 also includes a redial button 20 for redialing the previous telephone number, if necessary. Hence, if the handset is again taken off-hook and redial button 20 is pressed, the previously dialed telephone number is automatically redialed, i.e., the number is forwarded to the local transmitter for transmission to the base station. Details of a suitable implementation of the redial function are set forth in U.S. Pat. No. 5,689,557 entitled "Telephone Having A Redial Buffer Storing Only Complete Telephone Numbers," of Diego A. Kaplan, Nov. 18, 1997.

As noted, telephone 10 includes circuitry or other logic for determining when a completed telephone number has been entered by a user using keypad 18. Telephone 10 also includes a timer, to be described below, which is activated to ensure that digits of a telephone number will eventually be transmitted, even if the user does not enter a complete telephone number. The timer function also accounts for telephone numbers of the type wherein the total number of digits of a completed telephone number cannot be determined, such as international telephone numbers entered within the United States and prefaced by digits 0 and 1.

Figure 2:
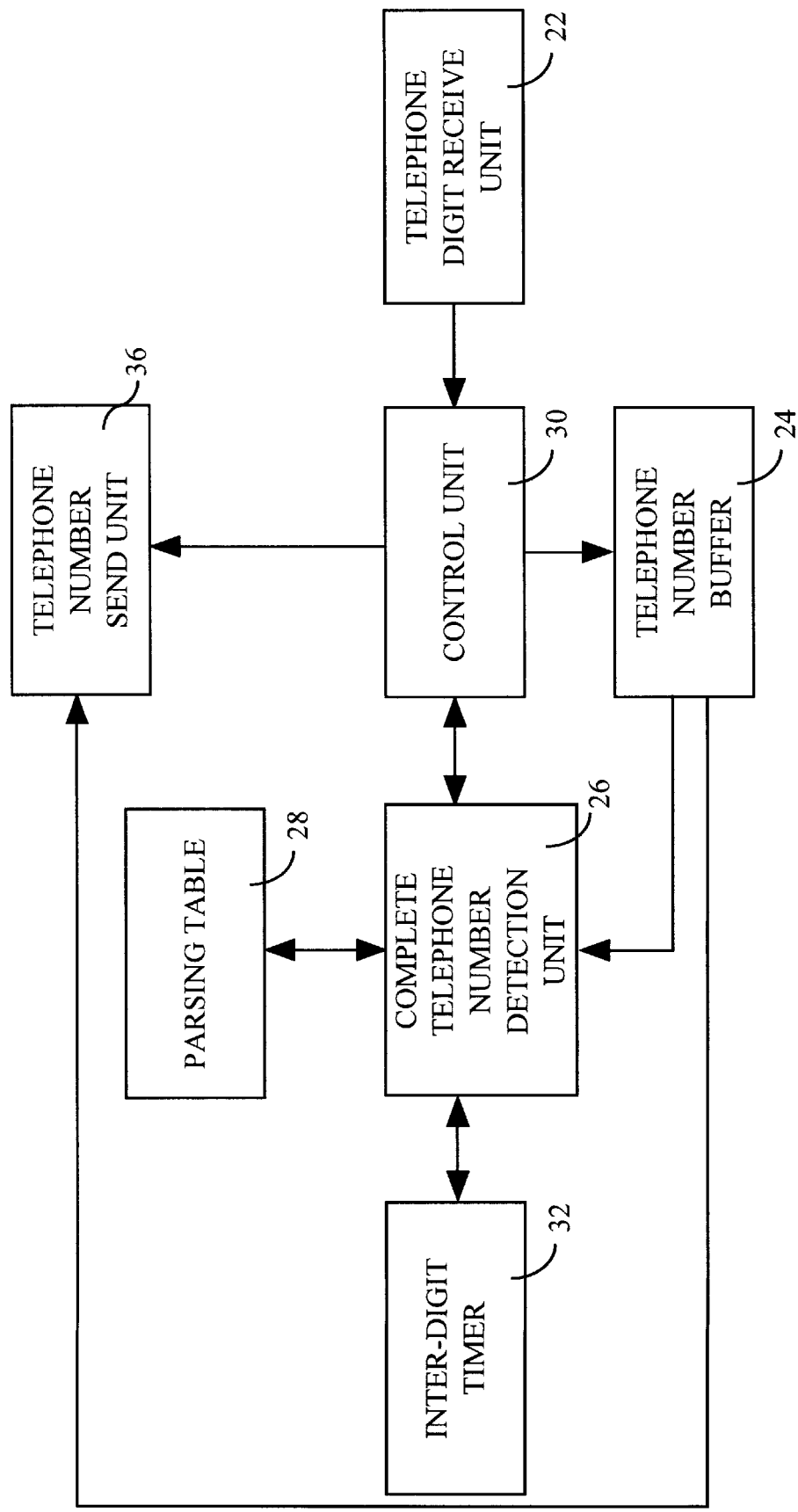
FIG. 2 is a block diagram of pertinent components of a telephone of the wireless local loop system of FIG. 1.

FIG. 2 illustrates pertinent components in block diagram form of the telephone of FIG. 1. Digits or other symbols entered by a user are received by a telephone digit receive unit 22 and stored within a telephone number buffer 24. Individual digits of the telephone number are also individually forwarded to a complete telephone number detection unit 26 which examines the digits and determines therefrom whether a completed telephone number has been entered. In this regard, the detection unit accesses a parsing table 28 which, as will be described below, contains rows of parsing states corresponding to permissible telephone number combinations. The detection unit accesses the parsing table using the entered digits until reaching a designated final state indicative of a completed telephone number. At that time, the completed telephone number is forwarded by the telephone number buffer to a telephone number send unit 36 which transmits the completed telephone number to the local transmitter (FIG. 1) for transmission to the local base station.

The telephone also includes an inter-digit timer 32 which is triggered following reception of each digit or other symbol. If no additional digits or other symbols are received within a predetermined time out period, the telephone number is assumed to be complete and is forwarded from the telephone number buffer to the send unit for transmission. Time out values for use by the inter-digit timer are stored within parsing table 28.

Operation of the various units of the telephone illustrated in FIG. 2 is controlled by a control unit 30 which may be configured, for example, as a hardware state machine or perhaps as software operating within a programmable microprocessor device.

FIG. 3 illustrates an exemplary embodiment of parsing table 28 of FIG. 2 for use with a wireless local loop telephone within the United States. The parsing table includes a plurality of rows 36 each corresponding to a unique parsing state. A total of twenty-seven rows are included and are numbered 0–26. The parsing table also includes a set of thirteen (13) columns with one column each corresponding to digits 0–9, the "*" symbol and the "#" symbol, and a timer column. Within FIG. 3, the columns are labeled according to the corresponding digit, symbol and the like.

Each column and row combination of table 28 identifies a unique entry 40 storing a numerical value. The entries within a timer column 52 specify a time out value, in half-second increments, for use by the inter-digit timer of FIG. 2. Entries of the remaining columns of the parsing table include either a numeric pointer to another row of the table, a positive final state indication value, or a negative final state indication value. Within the table of FIG. 3, the positive final state value is represented by the numeric value 127. The positive final state value effectively means "end of dialing: SEND". The negative final state indication values indicate either error conditions or local telephone software features. For example, a value of "−1" indicates that an error has occurred in dialing and that the entered string should be transmitted to the base station to get an error message from the base station. As another example, "−2" indicates that a feature error has occurred which can be handled by the telephone without requiring transmission to the base station. A value of "−3" indicates that additional keys entered by the user should be ignored until a reset occurs, such that numbers can be entered in the middle of a call to, for example, control an answering machine without triggering a SEND function. Additional negative final state values may be defined, depending upon the local phone software, to identify features supported by the phone software including, for example, speed dialing. Software or circuitry of the telephone, not separately shown, processes the negative final state indications to initiate the appropriate feature. It should be noted that, within FIG. 3, the only negative final state indication value is a "−1". The other negative state indication values summarized above may be implemented in alternative systems by storing the appropriate negative indication value within appropriate cells of the parsing table. Thus FIG. 3 includes one positive final state indication value of 127 and one negative final state indication value of "−1". All remaining entries are pointers in the range of 0–26 identifying rows of the table.

Parsing of an input telephone number string is performed as follows. A first row 1 of the table is accessed using the first digit or other symbol of the entered telephone number. The entry of the first row corresponding to the received digit or other symbol is accessed. The entry provides a pointer to another row of the table for use with the next entered digit or other symbol. For example, if the first digit entered is 0 then the 0 entry of row 1 is accessed to read the pointer "2". Hence, for the next digit or other symbol, row 2 is accessed. If the second digit is 1, then the 1 entry of row 2 is accessed yielding a pointer to row 3. This process continues until an entry having a value of 127 is accessed indicating that a completed telephone number has been entered or until a negative final state entry is accessed indicating an error or indicating that a function has been requested, such as an auto dial function.

Figure 4A:
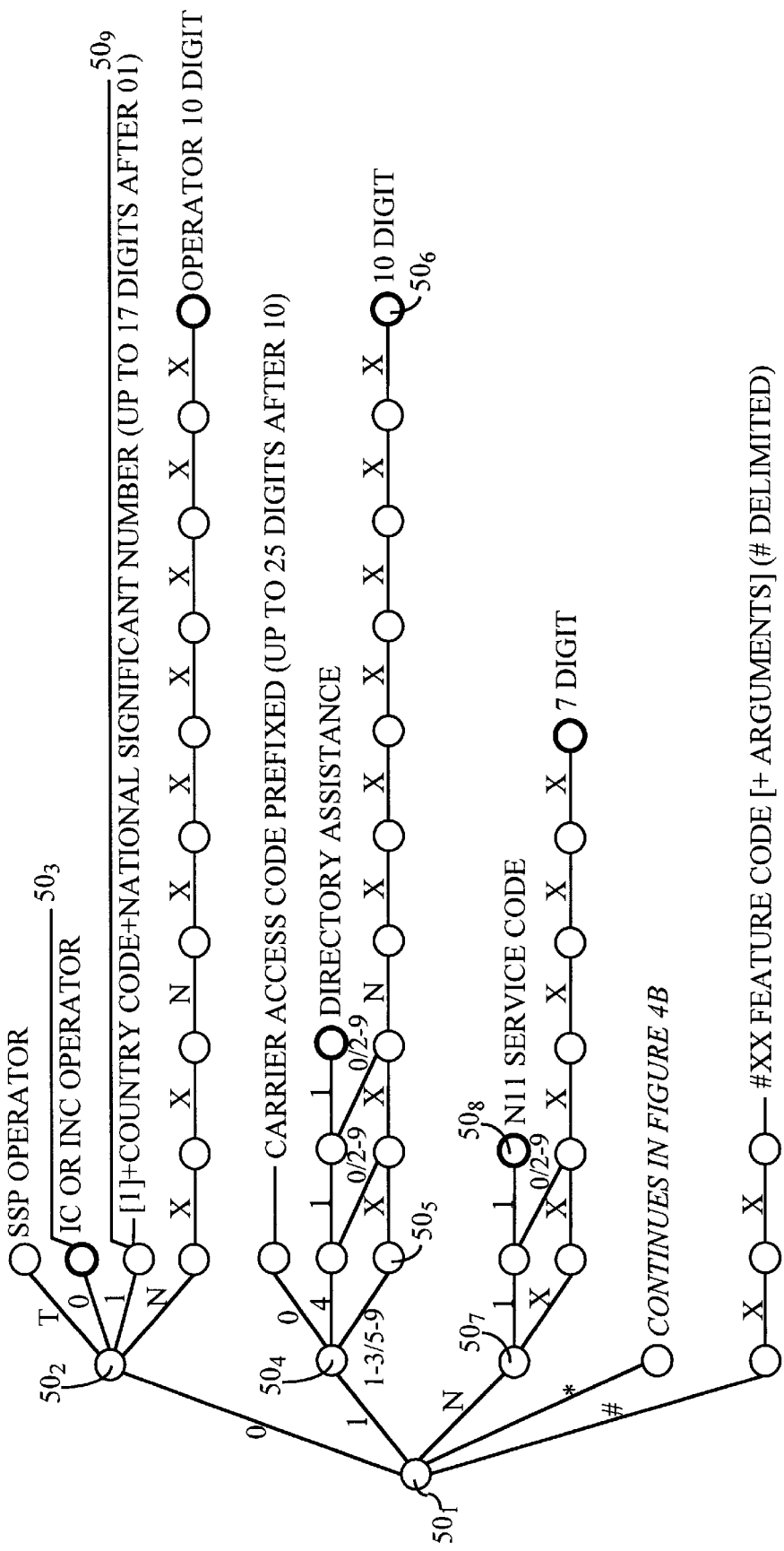
FIGS. 4A and 4B are diagrams illustrating parsing states for a telephone system of the United States.
Figure 4B:
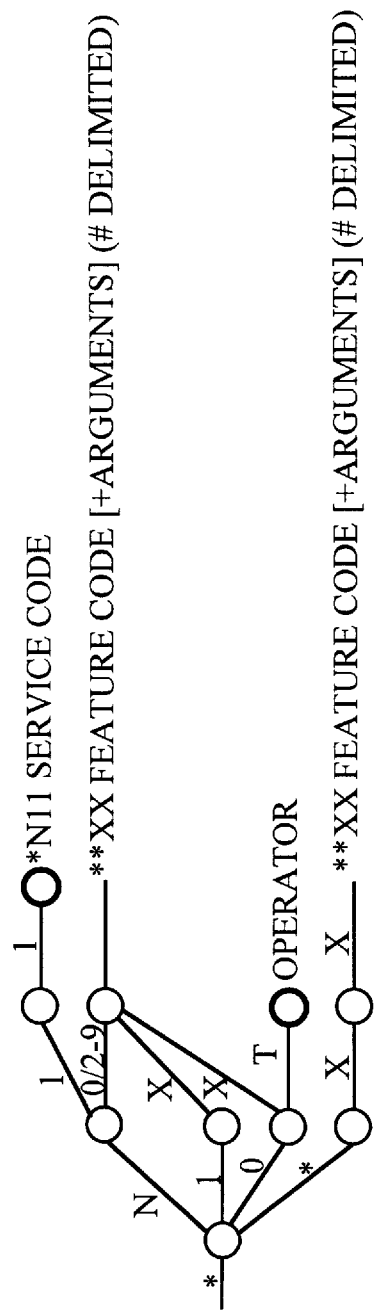

The parsing states represented by the table of FIG. 3 are set forth in schematic form within FIGS. 4A and 4B with FIG. 4B representing a continuation of one of the state branches set forth in FIG. 4A. FIGS. 4A and 4B illustrate a plurality of states 50 each represented by a circle. Exemplary states, discussed below, include subscripts. A transition from one state to another depends upon the received digit. Within FIG. 4A, for example, if the first entered digit is 0, then a transition is made from initial state $50_1$ to state $50_2$. If the second entered digit is also a 0 then a transition is made from state $50_2$ to state $50_3$. State $50_3$ represents a final state representative of connection to an international operator. Hence, once state $50_3$ is reached, the telephone number is deemed to be complete and the digits 00 are transmitted by the wireless local loop telephone to initiate connection with the international operator. Within FIG. 3, the aforementioned example wherein digits 00 are entered results in the following sequence. Initially, the 0 entry of row 1 is accessed yielding a pointer to row 2. Next, row 2 is accessed using the digit 0 yielding the final state value 127. Once the final state value is accessed, the complete telephone number detection unit determines therefrom that a completed telephone number has been entered and triggers transmission of the number. It should be noted that, because the digits 00 merely initiate connection to an international operator, the user may need to enter additional digits in response to requests by the international operator. However, for the purposes of the invention, the string 00 is deemed to be complete telephone number because it requires transmission before any further processing can be performed.

Referring again to FIG. 4A, as another example, if a U.S. long distance telephone number is entered, such as 1-619-587-1121, then a transition is first made from state $50_1$ to state $50_4$. Then, a transition is made from state $50_4$ to state $50_5$ upon reception of the first digit of the area code. Thereafter, a transition is made to each state following state $50_5$, which represents all remaining states of a direct dial U.S. long distance telephone number, until state $50_6$ is reached which represents a final state indicating that a complete direct-dialed long distance telephone number has been entered. Within the table of FIG. 3, the aforementioned long distance direct-dial telephone number example is processed as follows. Initially, row 1 is accessed with digit 1 yielding a pointer to row 13. Next, row 13 is accessed with digit 6 yielding a pointer to row 4. Then, row 4 is accessed with digit 1 yielding a pointer to row 5. Row 5 is accessed with digit 9 yielding a pointer to row 6. Repeated jumps to additional rows continue until the final digit of the telephone number "1" is entered and is used to access row 12. The entry within row 12 corresponding to the digit "1" contains the numeric value 127 identifying a final state. It should be noted that each entry of row 12 corresponding to 0–9 contain the final state value 127. This is because row 12 corresponds to the final state of all direct-dialed long distance telephone numbers. The finality of this state does not depend upon the last digit entered. In other words, the long distance telephone number is complete when the 11th digit has been entered regardless of what the 11th digit is.

As another example, if the digits 411 are entered to obtain directory assistance, then within FIG. 4A, a transition is first made from state $50_1$ to state $50_7$ upon reception of the digit 4. Entry of remaining digits 1–1 cause a transition to state $50_8$ which is a final state indicating completion of the directory assistance telephone number and triggering its transmission. Within FIG. 3, the entry of the telephone number 411 results in the following operations. Initially, row 1 is accessed with digit 4 yielding a pointer to row 17. Row 17 is accessed with digit 1 yielding a pointer to row 18. Row 18 is accessed with digit 1 yielding the final state indication value 127 indicating that a completed telephone number has been entered.

As noted above, special functions, such as auto-dial functions, can be identified within the parsing table of FIG. 3 by a negative final state value, other than –1, –2 or –3. When such a negative value is accessed from the parsing table, the telephone invokes logic to implement the special function (which may be entirely conventional and will not be described herein). As an example, a telephone may be configured to auto-dial one of ten programmed telephone numbers upon the entry of N* (wherein N is a digit from 1–9). Within the table of FIG. 3, entry of the initial digit triggers a jump to one of the other rows of the table. To implement the feature in the table of FIG. 3 a value of –127, for example, would be stored in the * column of lines 13 and 17. Then, regardless of the digit entered and the row jumped to, entry of the * would yields a value of –127 indicating that a function code has been entered. Thereafter, logic not separately shown and described herein, accesses the appropriate stored telephone number and transmits the telephone number. (It should be noted that FIGS. 4A and 4B do not set forth unique parsing states for all possible feature codes because feature codes often vary between specific telephones and between specific local telephone systems.)

In addition to accessing the parsing table using received digits in the manner described above, the complete telephone number detection unit also accesses the timer column 52 of the parsing table to read an inter-digit timer value. If the value is not set to 0, then a timer is activated. If no digits or other symbols are received within the time out period specified by the timer value, then the telephone number is assumed to be complete is and immediately transmitted. As noted above, this ensures that entered digits are eventually transmitted even if the user accidentally enters only a incomplete telephone number. The inter-digit timer is also employed in circumstances where it cannot be determined whether a complete number has been entered, particularly when an international telephone number is being entered. As an example, consider entry of a direct-dialed international telephone number preceded by digits 011. Within FIG. 4A, this corresponds to a transition from state $50_1$ to state $50_2$, then to state $50_9$. As can been seen, state $50_9$ is not actually a final state. However, the number of states following state $50_9$ are indeterminate because the number of digits of the international telephone number will depend upon, for example, the country being called.

Within the parsing table of FIG. 3, the direct-dialed international telephone number is processed as follows. Initially, row 1 1 is accessed with digit 0 yielding a pointer to row 2. Next, row 2 is accessed with the digit 1yielding a pointer to row 3. Row 3 is then accessed with digit 1 yielding a pointer to row 0. Thereafter, each digit of 0–9 yields another pointer to row 0. In other words, a loop is defined wherein row 0 is repeatedly accessed regardless of the digit entered. The loop is only terminated if either the * or # symbol is entered or, more likely, if the timer value of row 0 is exceeded. Hence, after entering preliminary digits 011, a user enters the digits of the international telephone number to be called which, in general, may include up to 17 digits. With each entered digit, the timer value of row 0 is accessed and a timer is activated. Within FIG. 3, an exemplary timer value of 20 half seconds is provided. Once the user has completed the international telephone number, no additional digits will be entered by the user and the time out value will eventually be exceeded following entry of the final digit. In other words, once ten seconds has elapsed after the user has entered the last digit of the international telephone number, the inter-digit timer will expire and the telephone number will be transmitted. Of course, depending on the implementation, the specific inter-digit timer value for row 0 may vary. In the example, a time out value of 10 seconds is provided to allow plenty of time for the user to enter each digit. A shorter time period could be employed but might result in a partial international telephone number being transmitted even though the user has not completed the telephone number. Such would likely result in annoyance to the user and may result in unnecessary costs to the user as a result of initiation of an international telephone number. Accordingly, a relatively high value of ten seconds is provided to ensure that the user has plenty of time to enter each digit of the international number. Also, FIG. 3 illustrates that the timer values corresponding to different states may differ. For example, the timer value for the 0 state is 20 half seconds whereas the timer value for the 2 state is only 10 half seconds.

In one embodiment of the invention, an additional method for terminating the loop is employed, whereby a maximum digital counter is set to the maximum number of digits that can be dialed when state 0 is entered. Each time the state table of FIG. 3 is the accessed, the counter is then decremented. When the counter is zero the dialed number is sent.

Thus, FIG. 3 illustrates one possible implementation of a parsing table for a United States telephone system. Digits used to represent the states may, of course, be set to any arbitrary value that do not conflict with row pointer values. As noted, timer values may differ as well. Moreover, depending upon the implementation, more or fewer rows of parsing states may be employed. For example, it may be desirable to eliminate some of the rows corresponding to telephone states of infrequently dialed telephone numbers. Even without those rows, such telephone numbers will, nevertheless, be transmitted after the time out value of the most recently accessed row elapses. Thus, the parsing table need not account for all possible telephone number combinations but may be configured to default to timer values for those states that are not explicitly represented. In still other circumstances, it may be desirable to provide a parsing table which includes even additional rows for use in accommodating telephone number sequences not explicitly set forth within the example parsing table of FIG. 3. FIG. 3 is merely an example of one possible implementation of a parsing table which incorporates principles in the invention but should not be construed as being the only possible implementation.

The parsing table itself may be implemented as a data structure within a memory accessible by the number detection unit which, itself, may comprise software running on a microprocessor or similar device. In other implementations, however, it may be desirable to implement the parsing table as a hard-wired state machine. Still other implementations may be selected. One of the advantages of implementing the parsing table as a data structure is that a data structure parsing table may be easily updated to accommodate additions to or modifications within the existing telephone system.

Figure 5A:
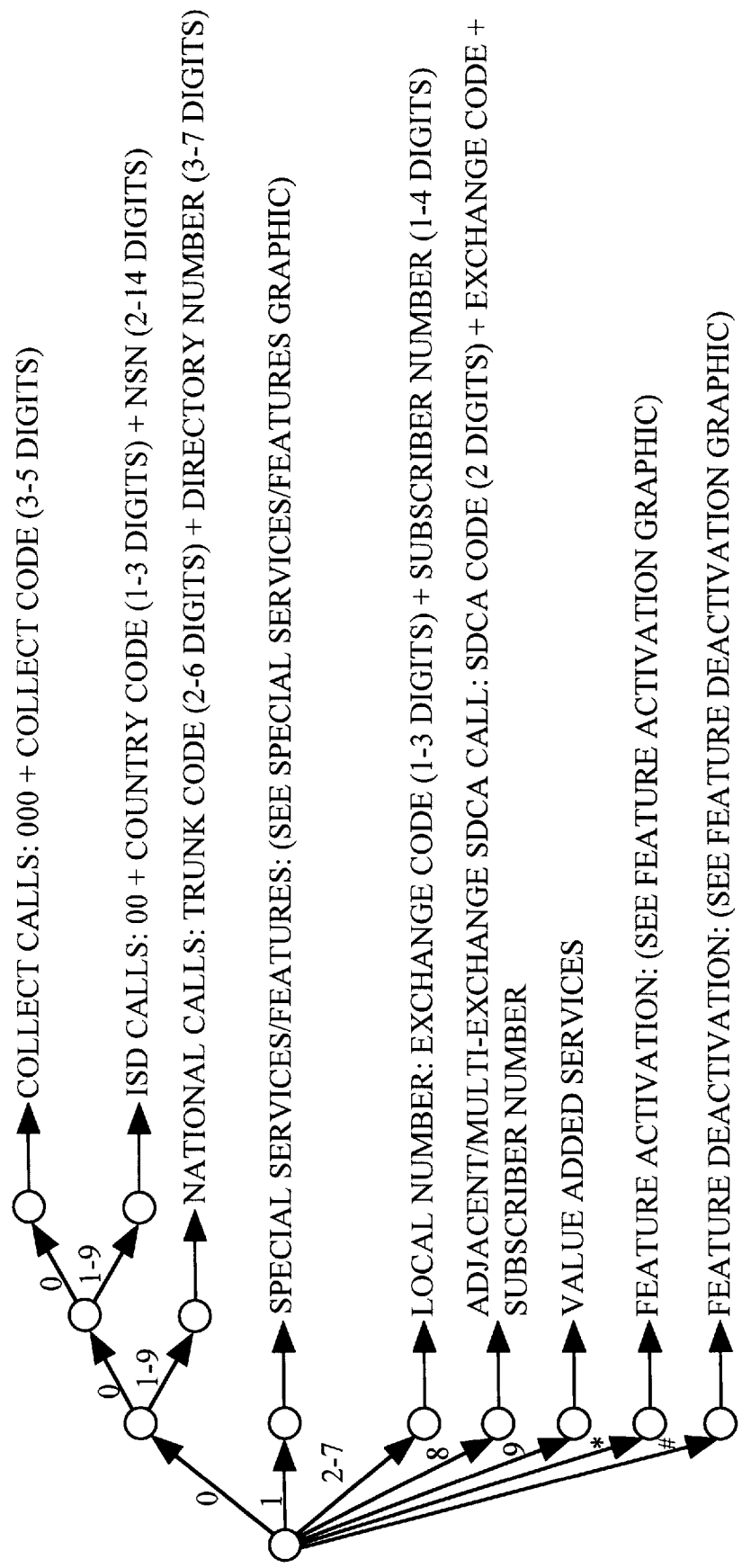
FIGS. 5A–5D are diagrams illustrating parsing states for the telephone system of India.
Figure 5B:
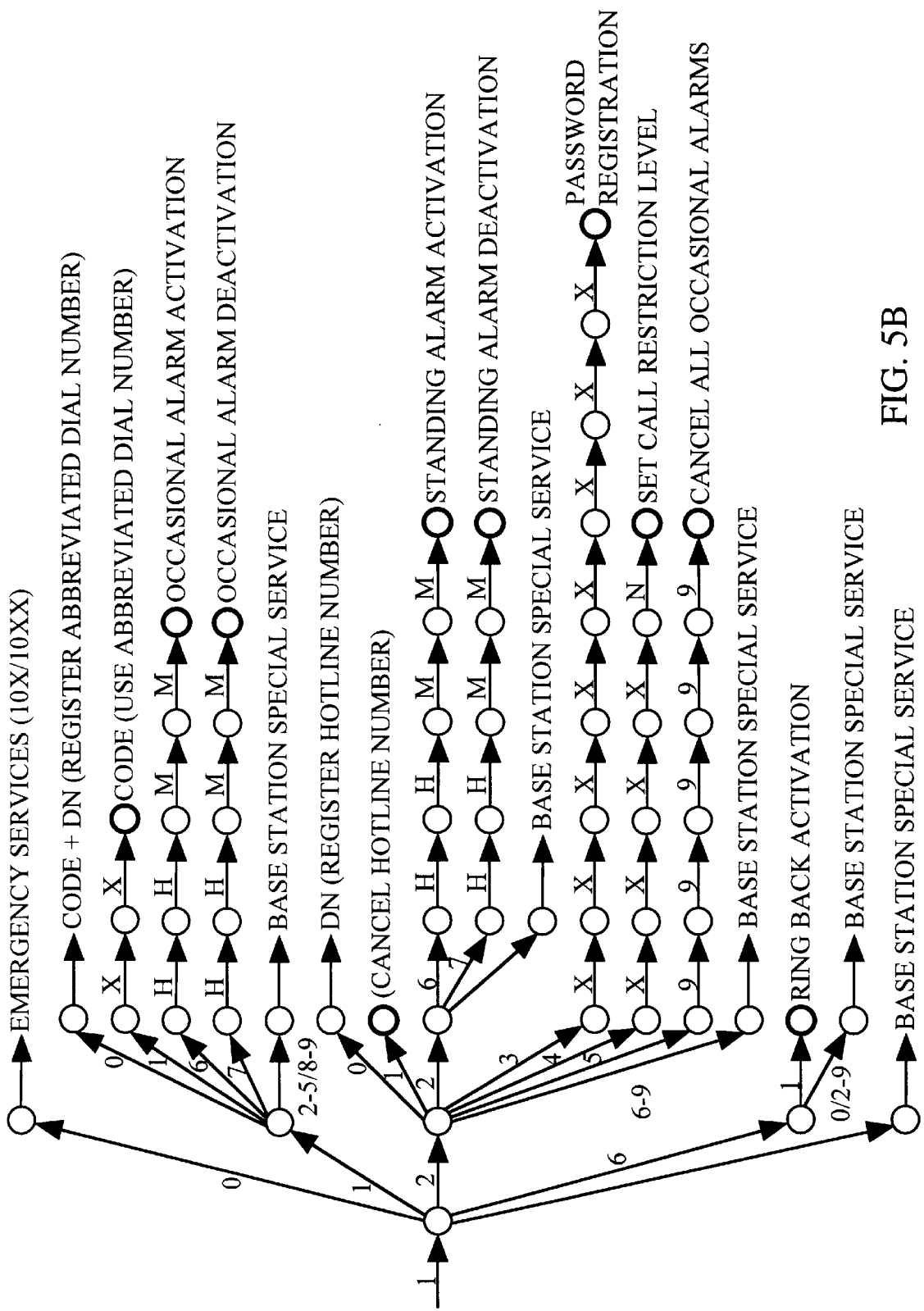
Figure 5C:
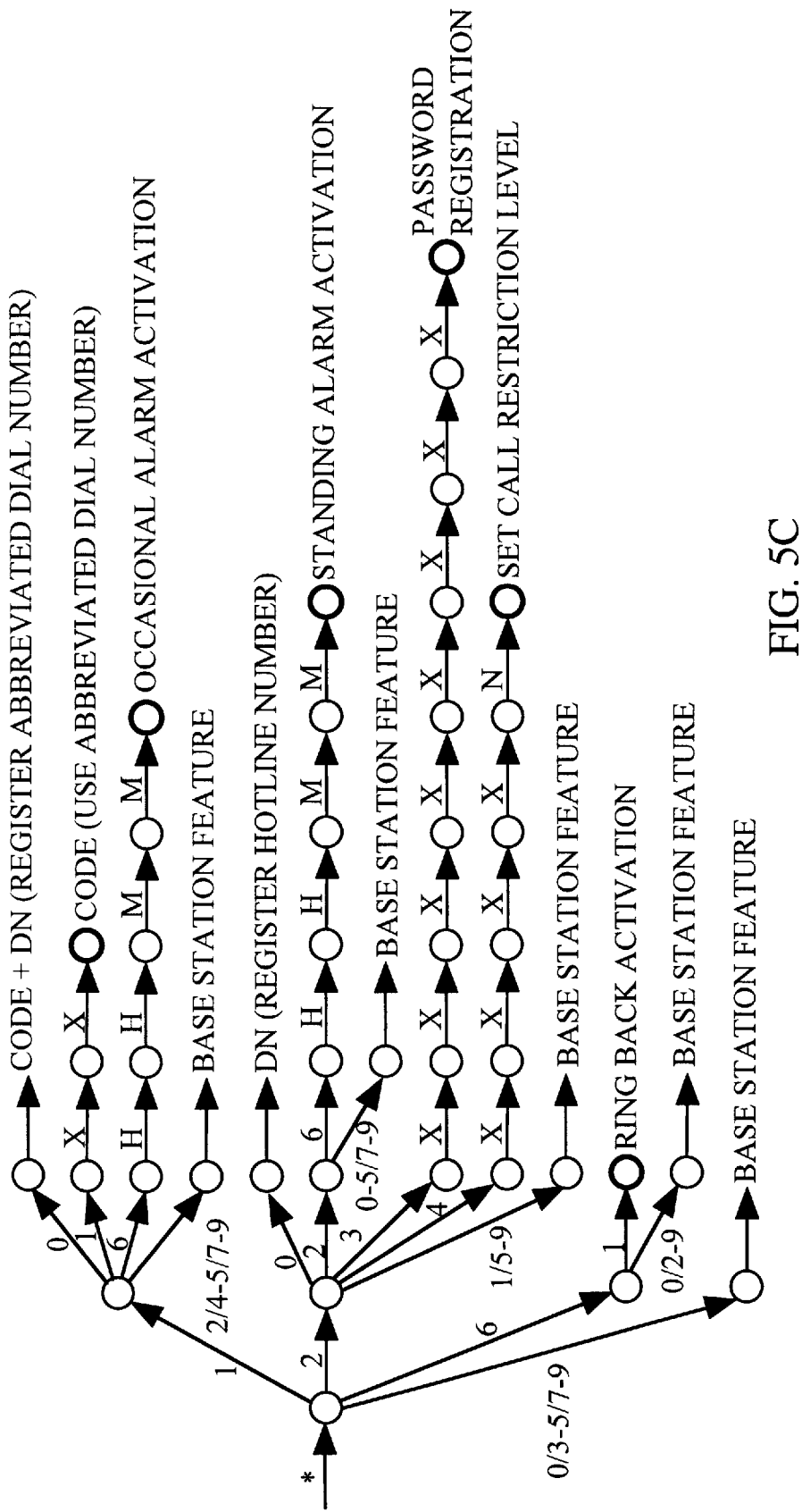
Figure 5D:
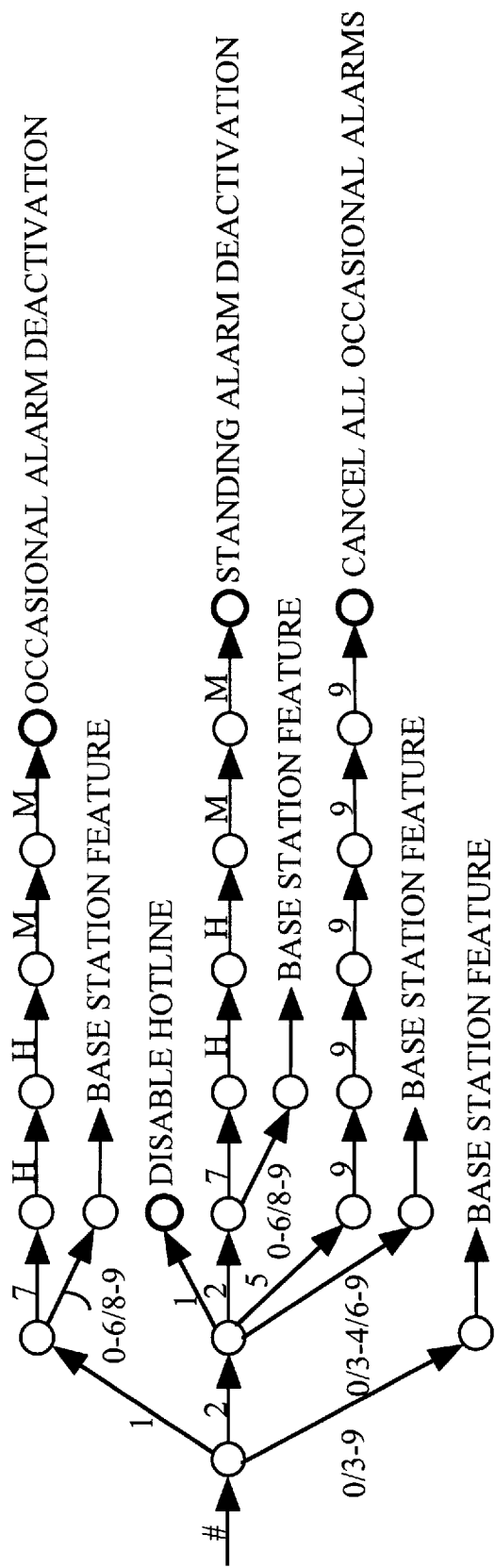

As noted, FIGS. 4A and 4B schematically illustrate the parsing states for the telephone system of the United States. FIGS. 5A–5D provide a schematic illustration of the parsing states for the telephone system of India. FIG. 5A illustrates parsing states for most permissible telephone numbers. FIG. 5B illustrates parsing states for certain special services and features activated by first dialing a "1". FIG. 5C illustrates certain parsing states related to feature activation triggered by first entering a "*". FIG. 5D illustrates parsing states related to feature de-activation triggered by first entering a "#". The comparison of FIGS. 5A–5D with FIGS. 4A–4B illustrates some similarities but also illustrates the increased complexity and number of parsing states associated with providing function code capability. Although not separately shown, a parsing table similar to that of FIG. 3 is configured to represent the parsing states of FIGS. 5A–5D. More specifically, a separate row is created for each unique parsing state illustrated in FIGS. 5A–5D with appropriate pointers within that row pointing to other rows corresponding to other parsing states. It should be noted that, as with the parsing table of the United States embodiment, some parsing states illustrated in FIGS. 5A–5D may not be unique and may be represented by a single row within the table. In other words, there is not necessarily a one to one correspondence between the number of illustrated parsing states and the number of rows within the parsing table.

Figure 6:
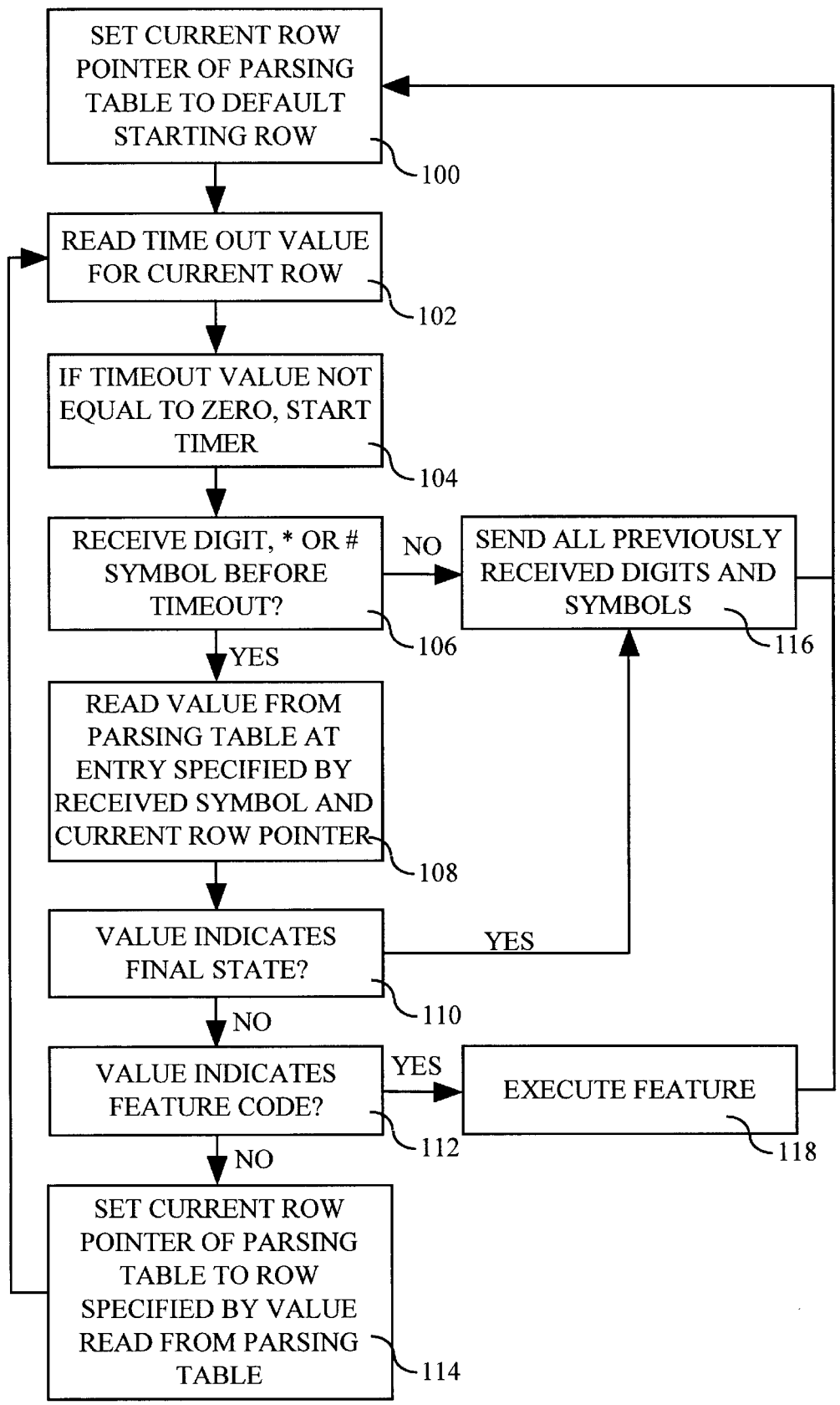
FIG. 6 is flowchart illustrating a method for determining whether a telephone number or other string of symbols entered into a wireless local loop telephone is complete for the purposes of transmission using the parsing states of FIG. 3.

FIG. 6 provides a flowchart summarizing the basic method for parsing telephone numbers described above. Initially, at step 100, a current row pointer of the parsing table is set to a default starting row. In the embodiment of FIG. 3, the default starting row is row 1. The current row pointer may be a software pointer maintained by the software accessing the data structure of the parsing table. Next, at step 102, the time out value for the current row is accessed. If, at step 104, the time out value is found to be not equal to 0, then the inter-digit timer is activated.

While the inter-digit timer is operating, the telephone may receive an additional digit or other symbol, step 106. If the digit or other symbol is received before the time out period expires, then execution proceeds to step 108 where the value from the parsing table at the entry specified by the received digit or other symbol and the current row pointer is accessed. The value is examined at step 110 to determine whether it indicates a final state. In the example above, the final state is identified by a value set to the number 127. If the value does not indicate a final state, then execution proceeds to step 112 where the value is examined to determine whether it identifies a feature code. Again, if it does not, execution proceeds to step 114 where the current row pointer is reset to the row specified by the value read by the parsing table. In other words, if the value does not indicate a final state and does not indicate a feature code, then the value is assumed to be a pointer to another row of the table. Hence, the current row pointer is updated accordingly.

Execution then returns to step 102 where the time out value for the new current row is read out and the timer is reset and restarted. Steps 102–114 are performed in a loop until a branch is detected either at steps 106, 110, or 112. If, at step 106, a digit or other symbol is not received before the time out value, then execution branches to step 116 where all previously received digits or other symbols are transmitted. It is noted that, with the parsing table implementation of FIG. 3, when step 116 is executed at least one digit will already have been received because the time out value for the first row of the parsing table is set to 0. Hence, the timer is not activated until at least one digit has already been received. After the digits and other symbols are transmitted, at step 116, execution returns to step 100 for eventual processing of digits corresponding to another telephone number.

As noted, branches from the main loop of FIG. 6 may also occur at steps 110 and 112. More specifically, if, at step 110, it is determined that the value read from the parsing table indicates a final state, then execution proceeds to step 116 where all previously received digits are transmitted and then to step 100. If, at step 112, the value read from the parsing table identifies entry of a feature code, then execution proceeds to step 118 where the feature is executed which may, for example, involve operation of an auto dial function for dialing previously stored telephone numbers. After the feature code is executed, processing ultimately returns to step 100.

Thus, FIG. 6 illustrates a method for processing telephone numbers. The method is preferably employed in connection with the apparatus of FIGS. 1–2 and the parsing table of FIG. 3. However, depending upon the implementation, the method may be implemented using other systems or apparatus. Likewise, the apparatus of FIGS. 1–2 and the parsing table of FIG. 3 may be employed in connection with a processing method other than the one specifically set forth in FIG. 6.

Figure 7A:
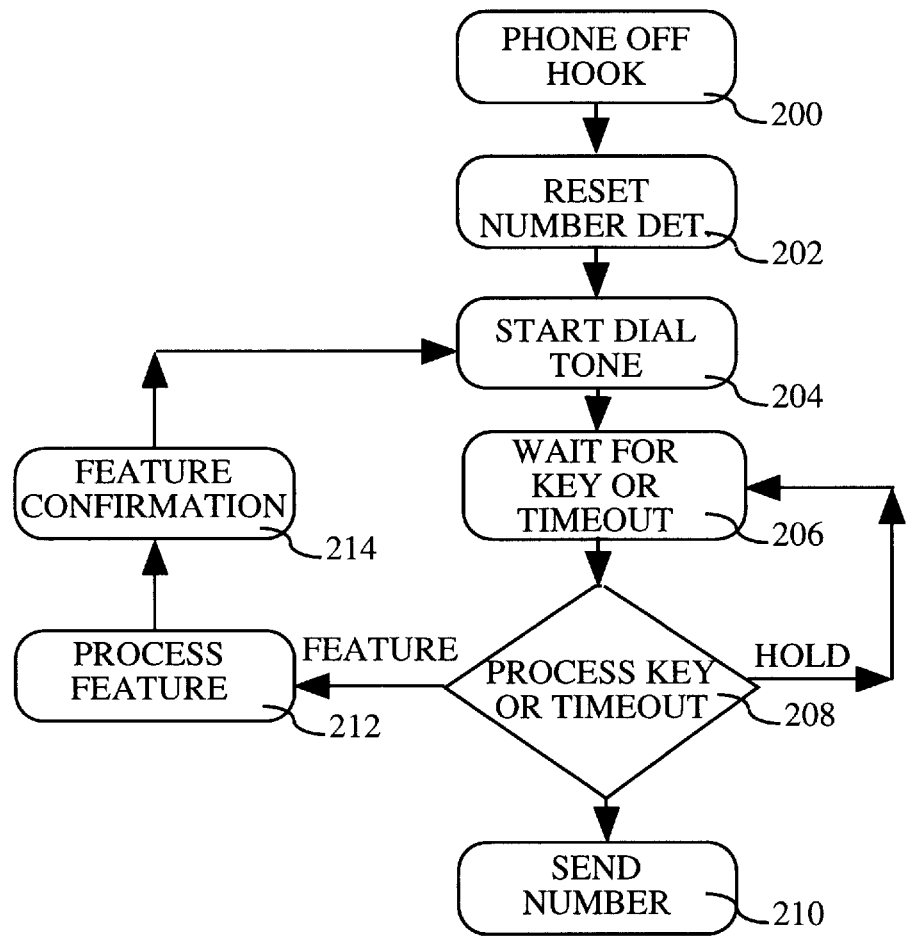
FIGS. 7A and 7B are flowcharts illustrating an alternative embodiment of the determination method of FIG. 6.
Figure 7B:
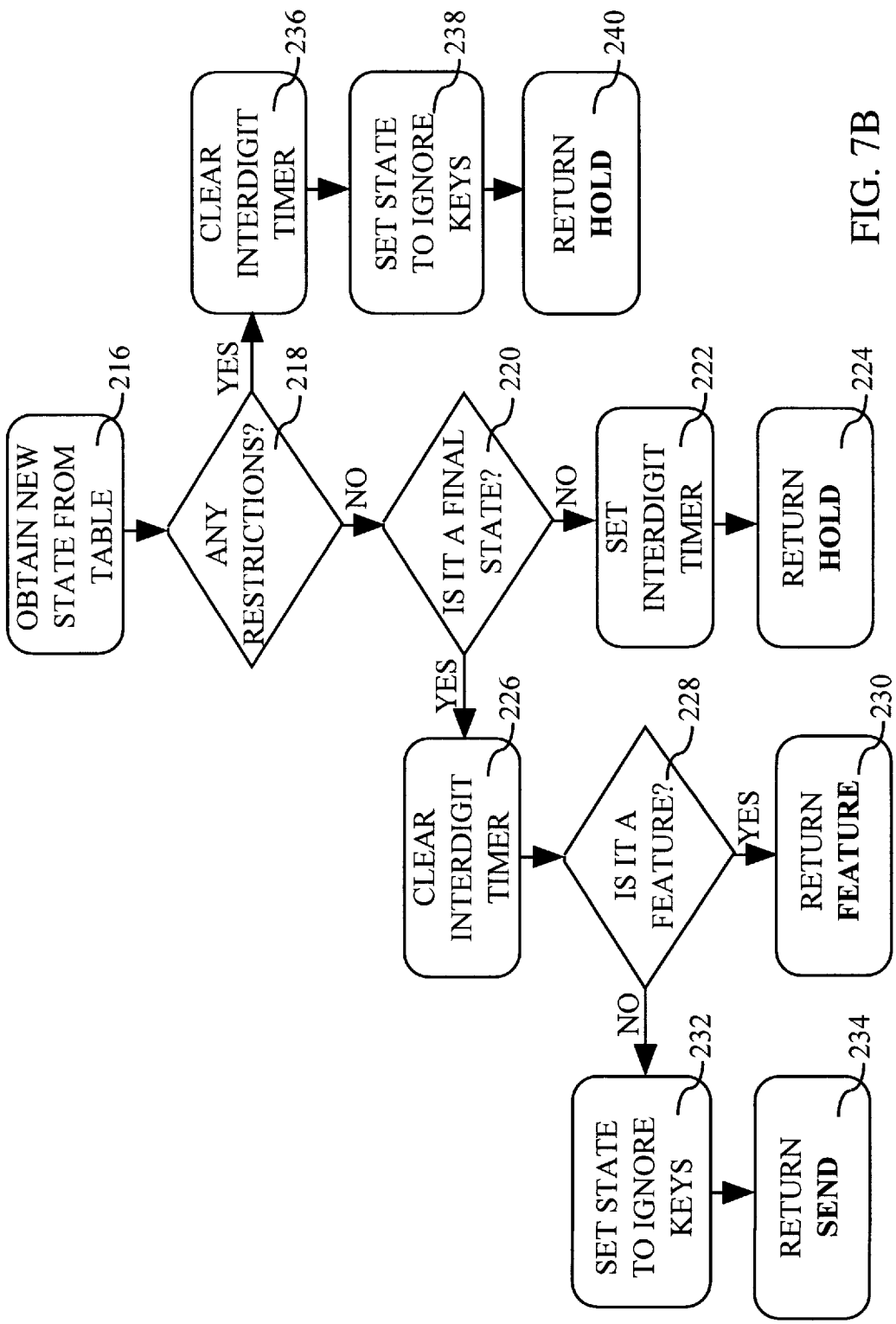

An alternative method for processing telephone numbers is illustrated in FIGS. 7A and 7B. This method is similar to that of FIG. 6 and therefore will not be described in complete detail. Rather, only pertinent differences will be described.

FIG. 7A provides an overview of the alternative parsing method beginning with step 200 wherein the telephone is taken off-hook and ending with step 210 wherein a received telephone number, that has been determined to be complete, is transmitted. Steps which differ from, or are in addition to, those of FIG. 6 include the following. At step 202, number determination components are reset. This involves resetting any necessary pointers for use with a parsing table and resetting input number buffers, etc. Also, at step 204, a dial tone is activated to simulate a PSTN telephone. Although not separately shown, the dial tone is preferably de-activated as soon as the first digit or other symbol is entered by the user. At step 206, the telephone waits to receive a "key" which may be a digit or other symbol. Additionally, if the inter-digit timer is activated, the telephone waits for a time out value. If a key is entered or a time out value is reached, step 208 is processed.

FIG. 7B provides sub-steps corresponding to step 208 of FIG. 7A. At step 216, a new state is obtained from the parsing table. This is achieved by reading an entry from the table from a row identified by a current row pointer and from a column identified by the latest symbol or key received. At step 218, it is determined whether the new state has any corresponding restrictions. A restriction is a limitation on types of telephone calls that may be made from the telephone. For example, particular telephones may be configured to prevent users from dialing long distance telephone numbers or from accessing certain specific features or functions. A value representing the restriction may be stored within the parsing table itself or within another data structure having a unique entry for each unique state of the parsing table. If it is found that the current state is subject to a restriction, then execution proceeds to step 236 and 238 where the inter-digit timer is cleared and the telephone is set to ignore any further keys or symbols entered. Hence, any additional digits entered by the user after step 238 are simply ignored, thus preventing the user from dialing a telephone number corresponding to a state subject to restriction. Execution then returns to step 206 of FIG. 7A through step 240. With the inter-digit timer cleared and further keys ignored, steps 206 and 208 are repeated indefinitely until the telephone is placed on-hook. In other words, once a restriction is detected at step 218 of FIG. 7B, the telephone does not respond to any further keys or perform any further functions until placed on-hook, then taken off-hook again. In an alternative system, not separately shown, the detection of a restriction is treated in the same manner as detection of a missed dialed feature code causing a feature rejection tone to be generated by the handset of the telephone followed by a dial tone and a restart of the number determination process. In other words, in the alternative system, the user, upon entering a restricted telephone number of the like, hears a rejection tone and is then immediately presented with a dial tone again.

Continuing with the description of the system illustrated in FIGS. 7A and 7B, if at step 218 FIG. 7b no restrictions are found, then execution proceeds to step 220 where it is determined whether a final state has been reached. If not, then the inter-digit timer is set at step 222 and execution returns to step 206 of FIG. 7A via step 224. If a final state is reached at step 220, then execution proceeds to step 226 where the inter-digit timer is cleared. At step 228, it is determined whether the final state corresponds to a feature code. If so, execution proceeds to step 212 of FIG. 7A where the feature is processed. Confirmation of execution of a feature is performed at step 214 then execution returns to step 204 where a dial tone is again initiated.

If, at step 228 of FIG. 7B, the final state is not identified as a feature code, then execution proceeds to step 232 where further keys are ignored, then to step 210 of FIG. 7A via step 234 where all digits, keys or other symbols previously entered are sent or transmitted from the telephone.

Thus, FIGS. 7A and 7B illustrate an alternative method for processing telephones which include some additional features not found in the method of FIG. 6. Additional specific methods may be provided in accordance with the principles of the invention. One such additional method relates to the handling of conference calls. Conference calls may be processed as follows. To initiate a conference call, a user performs a FLASH operation either by pressing a FLASH button or by quickly taking the telephone on-hook then off-hook. The FLASH signal is forwarded to the local telephone switch, which may be interconnected to the local base station. The switch determines whether the user is attempting to initiate a conference call or merely answering a call waiting function. Meanwhile, the telephone assumes that the FLASH operation is intended to initiate a conference call and resets the number determination parser to allow for additional telephone numbers to be dialed. If no digits are dialed within a predetermined period, such as five seconds, then the telephone assumes that the FLASH operation was in response to a call waiting signal and therefore continues to ignore entry of additional keys. The local switch ultimately determines whether the FLASH was intended to initiate a conference call or was merely in response to a call waiting function and responds appropriately by either connecting the conference call or switching to the alternative call that triggered the call waiting function. Other techniques for handling conference calls may alternatively be employed.

What has been described is a telephone number parsing method and apparatus for determining when a completed telephone number or other completed sequence of telephone digits or symbols has been entered. The invention has been described primarily in connection with a wireless local loop telephone but principles of the invention may be exploited within other telephone systems as well. The exemplary embodiments described herein are merely provided for illustrating the principles of the invention and should not be construed as limiting the scope of the invention.

What is claimed is:

1. A method for parsing and transmitting telephone number symbols using a telephone having a keypad and having a telephone number parsing table having a plurality of rows corresponding to different parsing states, a plurality of columns corresponding to different telephone number symbols, and entries, specified by unique row and column combinations, containing either a pointer identifying one of the rows of the table or a value indicating a final state representative of a string of telephone number symbols to be transmitted, and wherein the pointers are configured to provide a sequence of transitions within the table, based upon an entire sequence of entered telephone number symbols, with one transition per entered symbol for the entire sequence of entered symbols, said method comprising the steps of:

a) setting a current row pointer to identify a starting row of the table;

b) receiving a telephone number symbol entered by a user into the telephone using the keypad;

c) reading an entry from the table corresponding to the current row pointer location and the current received symbol; and d) if said entry is a pointer, resetting the current row pointer to the entry value and repeating steps b), c) and d) or, if said entry identifies a final state, then transmitting all telephone number symbols that had been entered by the user.

2. The method of claim 1 wherein the telephone number symbols include digits from 0–9, inclusive, the "*" symbol and the "#" symbol.

3. The method of claim 1 wherein the value indicating a final state corresponds to a state wherein a complete telephone number has been entered.

4. The method of claim 1 wherein the value indicating a final state corresponds to any telephone number symbol string requiring transmission.

5. The method of claim 1 wherein the table further includes an additional column specifying at least two different timer values corresponding to at least two different parsing states and wherein the method includes the additional step of:

reading the value from the timer column of the row pointed to by the current row pointer and, if no additional symbols are received within a time out period specified by the timer value, then transmitting all telephone number symbols that had been received from the user.

6. The method of claim 1 wherein the table further includes entries identifying reception of a function command and wherein the method includes the additional step of:

if the value of the entry corresponding to the current pointer and the current symbol is a function command identification value, then executing a function command specified by the function command identification value.

7. A wireless local loop telephone performing the method of claim 1.

8. An apparatus for parsing and transmitting telephone number symbols, said apparatus comprising:

means for receiving input telephone number symbols entered by a user;

a number parsing table having a plurality of rows and columns, with one column per permissible input symbol and one row per parsing state, said table having entries each containing either a pointer identifying a row of the table or a value indicating that the entry corresponds to a final state representative of a string of telephone number symbols to be transmitted, and wherein the pointers are configured to provide a sequence of transitions within the table, based upon an entire sequence of entered telephone number symbols, with one transition per entered symbol for the entire sequence of entered symbols;

means for accessing said table by applying a first received symbol to a first row of the table to read a pointer identifying another row of the table, then iteratively applying additional received symbols to additional rows specified by said pointers until reading out a value indicating that a final state has been reached; and means for transmitting all received input symbols upon reading out a value that a final state has been reached.

9. The apparatus of claim 8 wherein the input symbols include digits from 0–9, inclusive, the "*" symbol and the "#" symbol.

10. The apparatus of claim 8 wherein the value indicating that an entry corresponds to a final state indicates that a complete telephone number has been entered.

11. The apparatus of claim 8 wherein the value indicating a final state identifies any string of input signals requiring transmission.

12. The apparatus of claim 8 wherein said parsing table further includes an additional column specifying at least two different timer values corresponding to at least two different parsing states and wherein said means for accessing said table further includes means for reading the value from the timer column of a current row of a table and, if no additional symbols are received within a time out period specified by the timer value, then transmitting all telephone number symbols that had been received from the user.

13. The apparatus of claim 8 wherein said parsing table further includes entries identifying that a function command has been received and wherein said means for accessing said table further includes means, responsive to a detection that the entry corresponding to a current row and a current received symbol includes a value identifying the function command, for executing the function command.

14. A wireless local loop telephone incorporating the apparatus of claim 8.

15. An apparatus comprising:

a telephone coupled to a wireless local loop system;

a telephone digit receive unit for receiving digits and other symbols of a telephone number to be transmitted that are entered by a user using the telephone;

a telephone number buffer for storing received symbols;

a complete telephone number detection unit for examining symbols stored within the telephone number buffer and for determining therefrom whether a complete telephone number has been entered, said detection unit accessing a parsing table having a plurality of rows corresponding to different parsing states, a plurality of columns corresponding to different telephone number symbols, and entries specified by unique row and column combinations containing either a pointer identifying one of the rows of the table or a value representative of a string of telephone number symbols to be transmitted, and wherein the pointers are configured to provide a sequence of transitions within the table, based upon an entire sequence of entered telephone number symbols, with one transition per entered symbol for the entire sequence of entered symbols; and a telephone number send unit for sending all symbols stored within the telephone number buffer upon reception of a signal from the telephone number detection unit indicating that a completed telephone number has been received.

16. The apparatus of claim 15 further including an inter-digit timer activated following reception of each symbol for outputting a signal if an additional symbol is not received within a time out period employed by the timer; and wherein the complete telephone number detection unit outputs a signal indicating that a complete telephone number has been received upon reception of a signal from said inter-digit timer.

17. A method for parsing and transmitting telephone number symbols using a telephone having a keypad and having a telephone number parsing table having a plurality of rows corresponding to different parsing states, a plurality of columns corresponding to different telephone number symbols, and entries, specified by unique row and column combinations, containing either a pointer identifying one of the rows of the table or a value indicating a final state representative of a string of telephone number symbols to be transmitted, and wherein the pointers are configured to provide a sequence of transitions within the table, based upon an entire sequence of entered telephone number symbols, with one transition per entered symbol for the entire sequence of entered symbols, and wherein the table further includes an additional timer column specifying at least two different timer values for at least two different parsing state rows, said method comprising the steps of:

a) set a current row pointer to identify a starting row of the table, read a timer value provided in the starting row of the table, and, if the timer value is not zero, set a current timer value to the timer value provided in the starting row of table;

b) detect receipt of a telephone number symbol entered by a user into the telephone using the keypad; and c) if no telephone number symbol is received within the time specified by the current timer value, transmit telephone number symbols, if any, already received from the user; or d) if a telephone number symbol was received within the time specified by the current timer value, then
   read a new timer value provided in the row of the table pointed to by the current row pointer and reset the current timer value to the new timer value,
   read an entry from the table corresponding to the current row pointer location and the current received symbol, and
   if said entry read from the table is a pointer, reset the current row pointer to the entry value and return to step b) or, if said entry identifies a final state, then transmit all telephone number symbols already received from the user.

18. A wireless local loop telephone performing the method of claim 17.

19. A method for parsing and transmitting telephone number symbols using a telephone having a keypad and having a telephone number parsing table having a plurality of rows corresponding to different parsing states, a plurality of columns corresponding to different telephone number symbols, and entries, specified by unique row and column combinations, containing either a pointer identifying one of the rows of the table or a value indicating a final state representative of a telephone number to be transmitted or indicative of a function command, and wherein the pointers are configured to provide a sequence of transitions within the table, based upon an entire sequence of entered telephone number symbols, with one transition per entered symbol for the entire sequence of entered symbols which may be either, said method comprising the steps of:

a) setting a current row pointer to identify a starting row of the table;

b) receiving a telephone number symbol entered by a user into the telephone using the keypad;

c) reading an entry from the table corresponding to the current row pointer location and the current received symbol; and d) if said entry is a pointer, resetting the current row pointer to the entry value and repeating steps b), c) and d) or, if said entry identifies a final state, then determining whether the final state identifies a completed telephone number or a function command and
   if said entry identifies a completed telephone number, then transmitting all telephone number symbols that had been entered by the user, or
   if said entry identifies a function command, then executing the function command.

20. A wireless local loop telephone performing the method of claim 19.

* * * * *